(12) United States Patent
Tamer

(10) Patent No.: US 10,208,785 B2
(45) Date of Patent: Feb. 19, 2019

(54) STAY TIGHT THREADED FASTENERS

(71) Applicant: Albert Tamer, San Francisco, CA (US)

(72) Inventor: Albert Tamer, San Francisco, CA (US)

( * ) Notice: Subject to any disclaimer, the term of this patent is extended or adjusted under 35 U.S.C. 154(b) by 0 days.

(21) Appl. No.: 15/662,313

(22) Filed: Jul. 28, 2017

(65) Prior Publication Data
US 2017/0321742 A1   Nov. 9, 2017

Related U.S. Application Data

(63) Continuation-in-part of application No. 14/548,203, filed on Nov. 19, 2014, now Pat. No. 9,752,612.

(51) Int. Cl.
| F16B 39/282 | (2006.01) |
| F16B 37/00 | (2006.01) |
| F16B 33/02 | (2006.01) |
| F16B 39/10 | (2006.01) |
| F16B 39/32 | (2006.01) |

(52) U.S. Cl.
CPC ............ *F16B 39/282* (2013.01); *F16B 33/02* (2013.01); *F16B 37/00* (2013.01); *F16B 39/10* (2013.01); *F16B 39/32* (2013.01)

(58) Field of Classification Search
CPC  F16B 21/125; F16B 25/0021; F16B 25/0052; F16B 33/02; F16B 33/002; F16B 37/00; F16B 37/12; F16B 39/04; F16B 39/10; F16B 39/282; F16B 39/30; F16B 39/32
USPC .................. 411/317, 318, 383, 411, 417, 438
See application file for complete search history.

(56) References Cited

U.S. PATENT DOCUMENTS

| 1,360,365 | A | * | 11/1920 | Cassells | ................... | F16B 39/32 411/205 |
| 1,455,700 | A | * | 5/1923 | Adams | ..................... | F16B 39/10 411/316 |
| 1,560,616 | A | * | 11/1925 | Stallard | ................... | F16B 39/32 411/294 |
| 1,739,410 | A | * | 12/1929 | Murphy | ................... | F16B 39/32 411/328 |
| 3,272,249 | A | * | 9/1966 | Houston | ................. | F16B 39/32 411/318 |
| 5,234,291 | A | * | 8/1993 | Swemmer | ........... | E21D 21/0026 405/259.1 |
| 7,052,334 | B1 | * | 5/2006 | Cabay | ..................... | F16B 39/04 411/326 |

(Continued)

*Primary Examiner* — Roberta S Delisle

(57) ABSTRACT

A male fastener, female fastener, and a plunger that is adapted to secure the female fastener to the male fastener, and to prevent unwanted loosening of the female fastener from the male fastener. The male fastener includes a shaft that may optionally include a plurality of protruding elements that extend outwardly from an external surface of the shaft. The protruding elements may be radially positioned in rows around a circumference of the shaft, to create a channel between the rows of protruding elements. The channel is adapted to receive a corresponding thread located within an aperture of the female fastener. The plunger is adapted to be inserted into a trench located between a set of protruding elements (or into multiple trenches located between multiple protruding elements). The plunger prevents the female fastener from rotating around the shaft in a direction towards the bottom portion of the male fastener.

8 Claims, 9 Drawing Sheets

(56) References Cited

U.S. PATENT DOCUMENTS

2005/0175432 A1\* 8/2005 Su .................. F16B 25/0015
411/417

\* cited by examiner

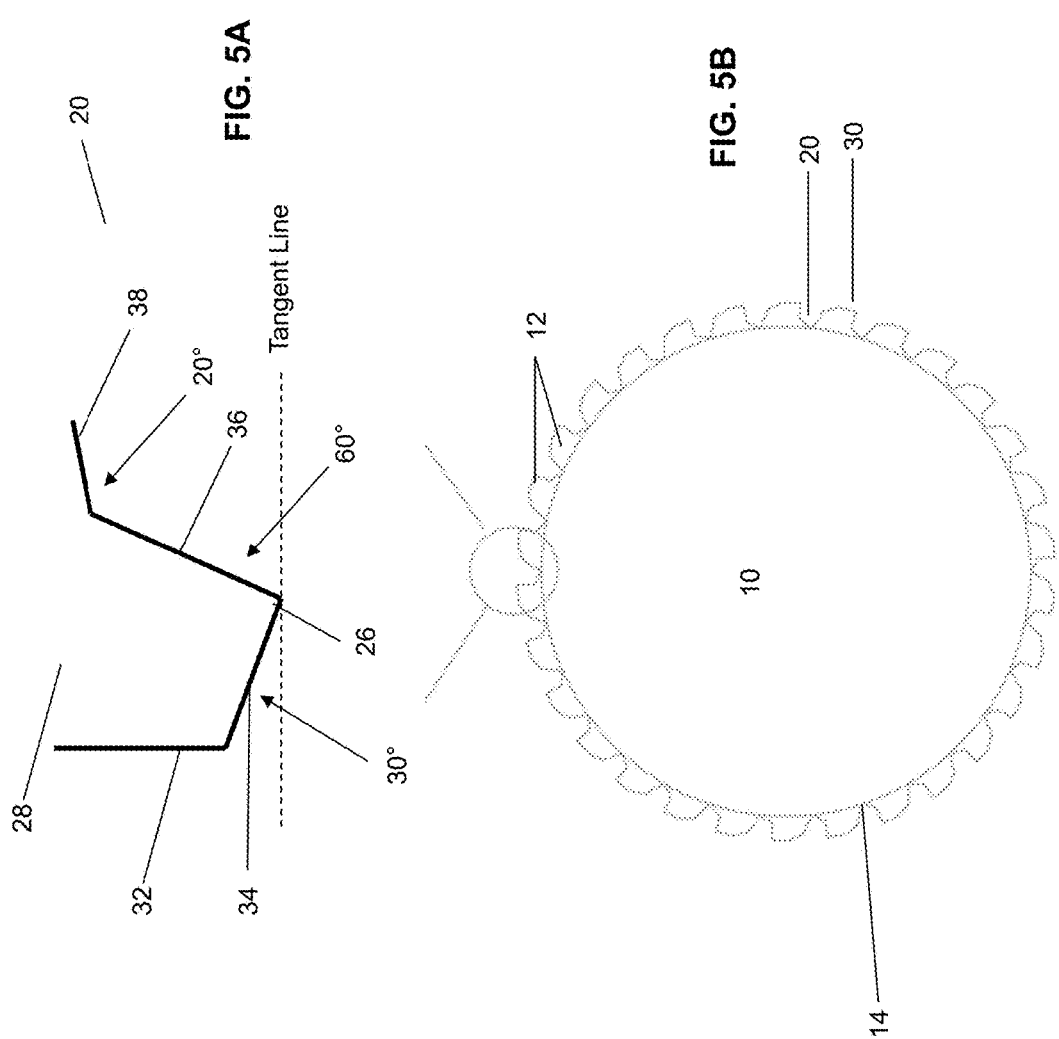

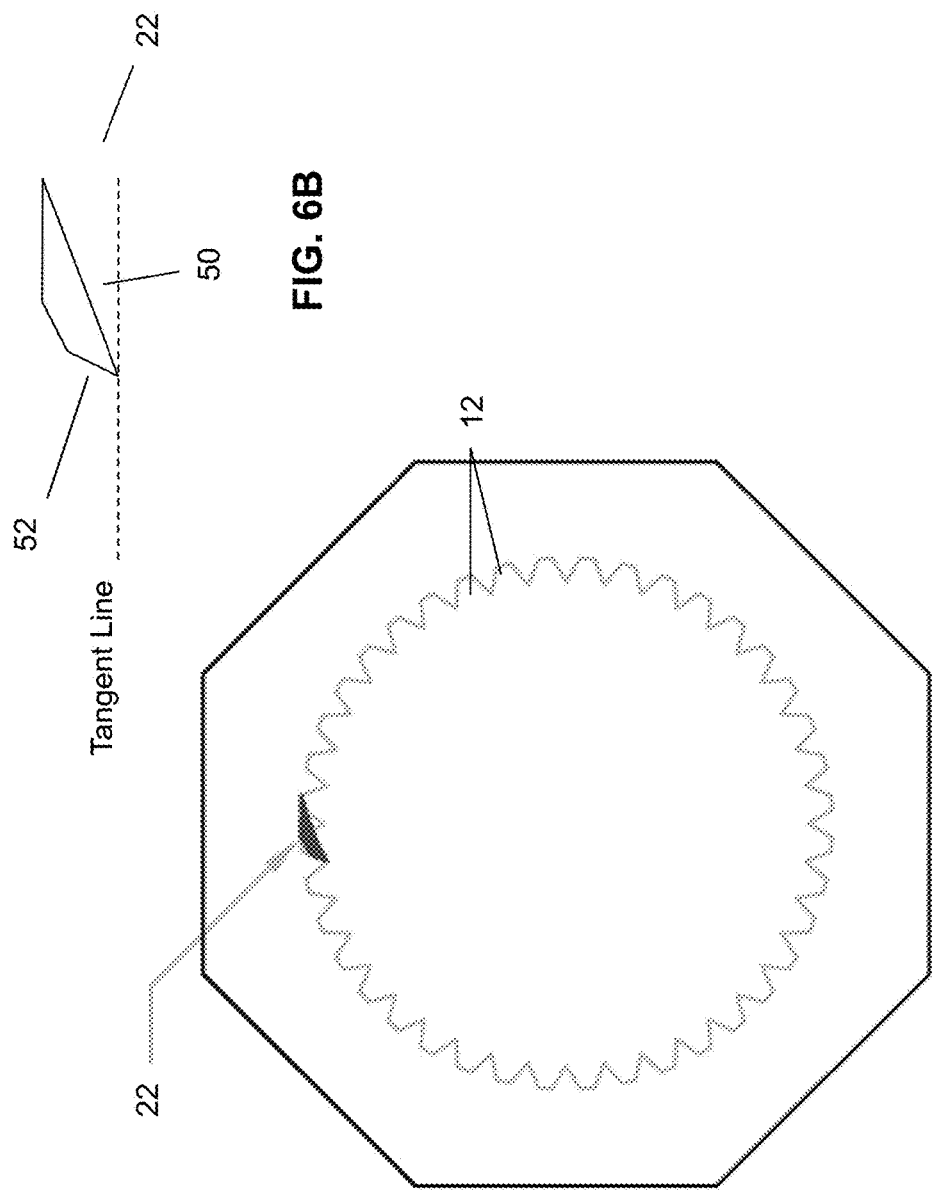

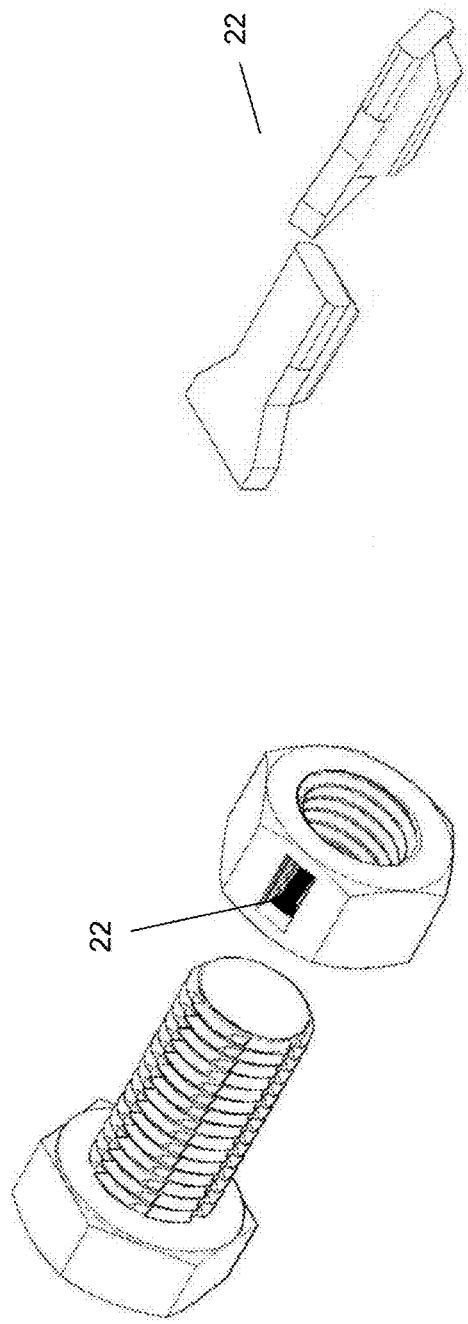
FIG. 7A
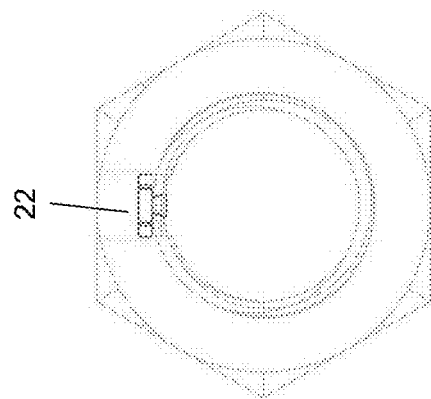
FIG. 7B
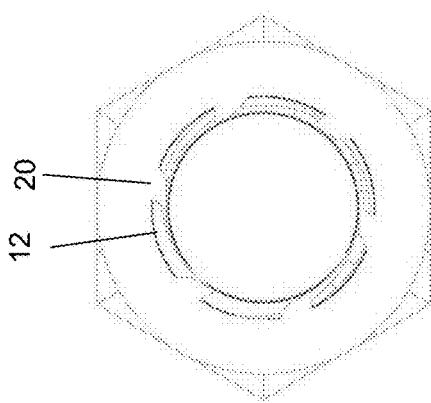
FIG. 7C
FIG. 7D

STAY TIGHT THREADED FASTENERS

CROSS-REFERENCE TO RELATED APPLICATIONS

This application is a continuation-in-part of U.S. patent application Ser. No. 14/548,203, filed on Nov. 19, 2014.

FIELD OF THE INVENTION

The field of the present invention relates to male and female threaded fasteners, including all variations of bolts, machine screws, nuts, washers, and the like. More particularly, the field of the present invention relates to threaded male and female fasteners that are used to hold different objects together, which are configured to avoid unwanted loosening of the male and female fasteners from each other.

BACKGROUND OF THE INVENTION

Male and female threaded fasteners, such as bolts and machine screws (along with corresponding nuts), are used in a variety of applications today, most often to connect and secure two or more pieces or items together. Indeed, for many years, male and female threaded fasteners have been used in residential and commercial construction, complex machine construction, and many other industries. A frequent and long-standing problem with male and female threaded fasteners is the unwanted (and sometimes dangerous) loosening of a female fastener (e.g., a nut) along the shaft of a corresponding male fastener (e.g., a screw or bolt), which may be caused by vibration, lubrication, thermal expansion and shrinkage, and other external forces. For example, when a screw/bolt and nut combination is incorporated into a complex machine that undergoes periodic vibrations, such vibrations will often cause the nut (over time) to loosen and travel along the threaded axis of the screw/bolt—in a direction that ultimately loosens the nut and screw/bolt combination, thereby loosening the two pieces that are connected together through such screw/bolt and nut combination.

Accordingly, there continues to be a demand in the marketplace for improved male and female threaded fasteners. More particularly, there continues to be a demand for improved male and female threaded fasteners, which are resistant to unwanted loosening over time. As the following will demonstrate, the invention described herein addresses such demands in the marketplace (as well as others).

SUMMARY OF THE INVENTION

According to certain aspects of the invention, male and female threaded fasteners are provided, such as screws, bolts, nuts, washers, and the like, which incorporate or are adapted to be used with certain plunger components. The male fasteners are adapted to be secured and connected to female fasteners in a manner that avoids unwanted loosening of the female fasteners from the male fasteners, e.g., as a result of vibrations or other forces over time. As used herein, the term "screw(s)" and "bolt(s)" are used interchangeably, and should both generally be construed to refer to a threaded male fastener, e.g., a male threaded component that is adapted to be received by, and to be connected to, a female threaded fastener (e.g., a nut). More particularly, the male fasteners (e.g., screws and bolts) will include a rigid shaft, which is configured to be disposed through and rotated within an aperture located in the middle of a female fastener (e.g., a nut or washer). As used herein, the term "female fastener" refers to a component that includes a threaded aperture, which is configured to receive the corresponding threaded shaft of the male fastener. As used herein, a female fastener may comprise a separate object, e.g., a nut, washer, or the female fastener (with its threaded aperture) may be incorporated into and form a part of a larger object.

In the broadest sense, the invention provides that the shaft of the male fastener will include one or more continuous radial walls that form one or more channels. The one or more continuous radial walls are adapted to receive a corresponding plunger located within or in proximity of an aperture of a female fastener. The threads of the female fastener (located within the aperture thereof) will be configured to engage the channels of the male fastener, such that the female fastener may be rotated in a way that causes the female fastener to travel towards the top of the male fastener along its shaft (i.e., to "tighten" the female fastener). After the female fastener is sufficiently "tightened," the plunger (located within or in proximity of the aperture of the female fastener) may be disposed into an area located within a continuous radial wall of the shaft of the male fastener (e.g., at or near the bottom surface of the female fastener), such that the plunger prevents the female fastener from "loosening" by rotating around the shaft in a direction that causes the female fastener to travel away from the top of the male fastener along its shaft.

According to certain specific embodiments, the shaft of the male fastener may comprise a series of protruding elements located within the continuous radial wall that forms the channel. In such embodiments, the invention provides that the protruding elements are preferably spaced equally part. The equally spaced protruding elements form a void (or space), between each protruding element. The invention provides that this resulting space is adapted to receive the plunger component. In this embodiment, as in the embodiment described above, the invention further provides that the plunger is configured to prevent the female fastener from rotating around the shaft in a manner that causes the female fastener to move in a direction towards the bottom portion of the male fastener (i.e., it is configured to prevent the female fastener from rotating in a counter-clockwise direction, which would otherwise loosen the female fastener).

According to further aspects of the present invention, sets of male and female threaded fasteners (e.g., screws and nuts), as described above, are included. In such embodiments, the plunger may be incorporated into the female fasteners or, alternatively, the plunger may exist as a separate component.

According to yet further aspects of the present invention, sets of male and female threaded fasteners (e.g., screws and nuts) and the plungers described herein are included. Similar to the other embodiments of the present invention, the plunger may be incorporated into the female fasteners or, alternatively, the plunger may exist as a separate component.

The above-mentioned and additional features of the present invention are further illustrated in the Detailed Description contained herein.

BRIEF DESCRIPTION OF THE FIGURES

FIG. 5A is a cross-sectional view of an embodiment of a space located between the protruding elements described herein.

FIG. 5B is a cross-sectional view of the shank of a male fastener, in which the space (located between two protruding elements) illustrated in FIG. 5A is located.

FIG. 6A is a cross-sectional view of a male and female fastener combination described herein, showing a plunger (which is integrally formed with an interior surface of the female fastener) being used to secure the female fastener in place.

FIG. 6B is an enlarged view of the plunger shown in FIG. 6A.

FIG. 7A is a perspective view of another set of male and female fasteners (bolt/nut) described herein.

FIG. 7B is a perspective view of the plunger element that is present in the female fastener shown in FIG. 7A.

FIG. 7C is a top view of the male fastener (bolt) shown in FIG. 7A.

FIG. 7D is a top view of the female fastener (nut) shown in FIG. 7A, along with the plunger of FIG. 7B.

DETAILED DESCRIPTION OF THE INVENTION

Figure 1:
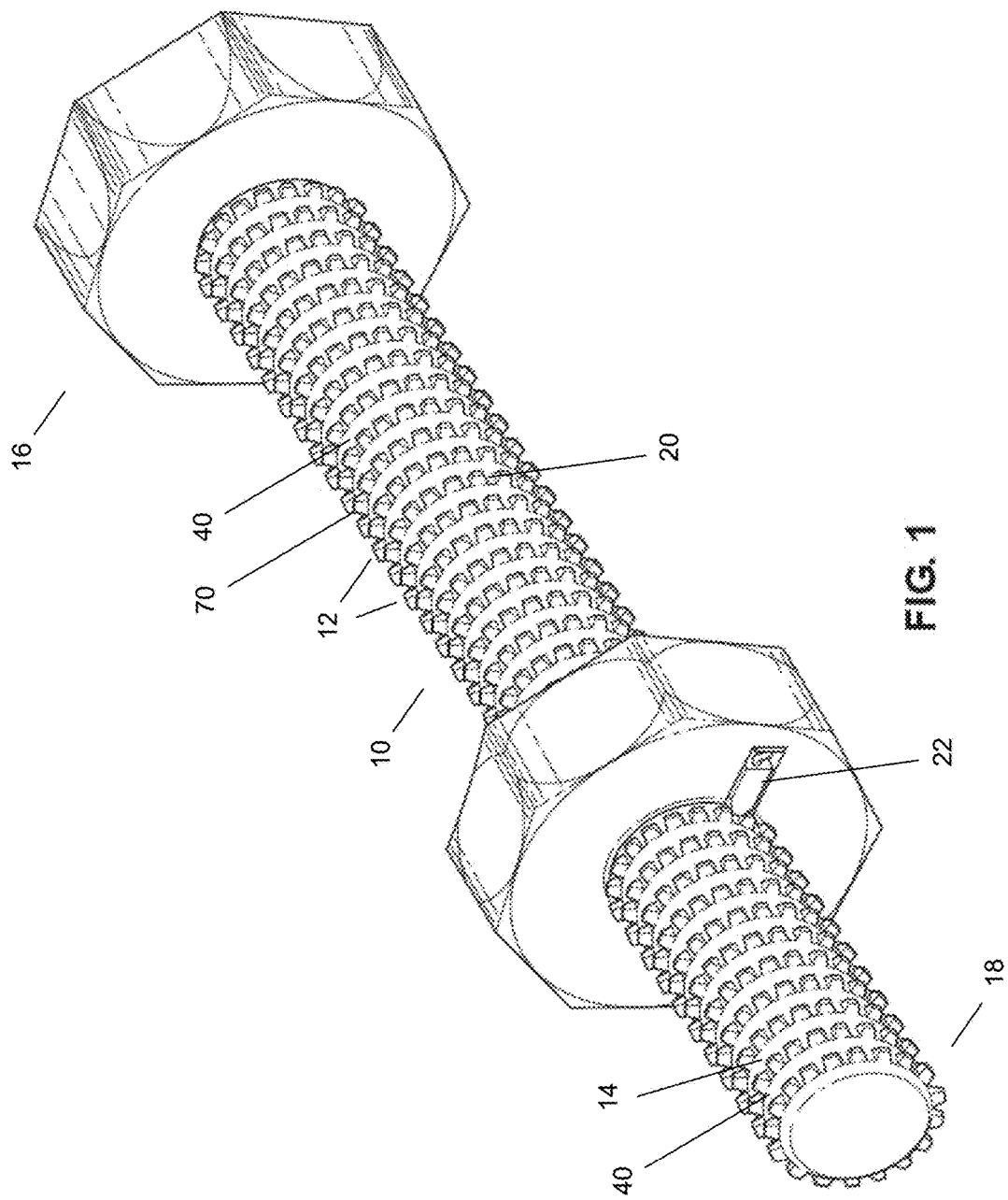
FIG. 1 is a perspective view of a male and female fastener (screw/nut) combination described herein.
Figure 2:
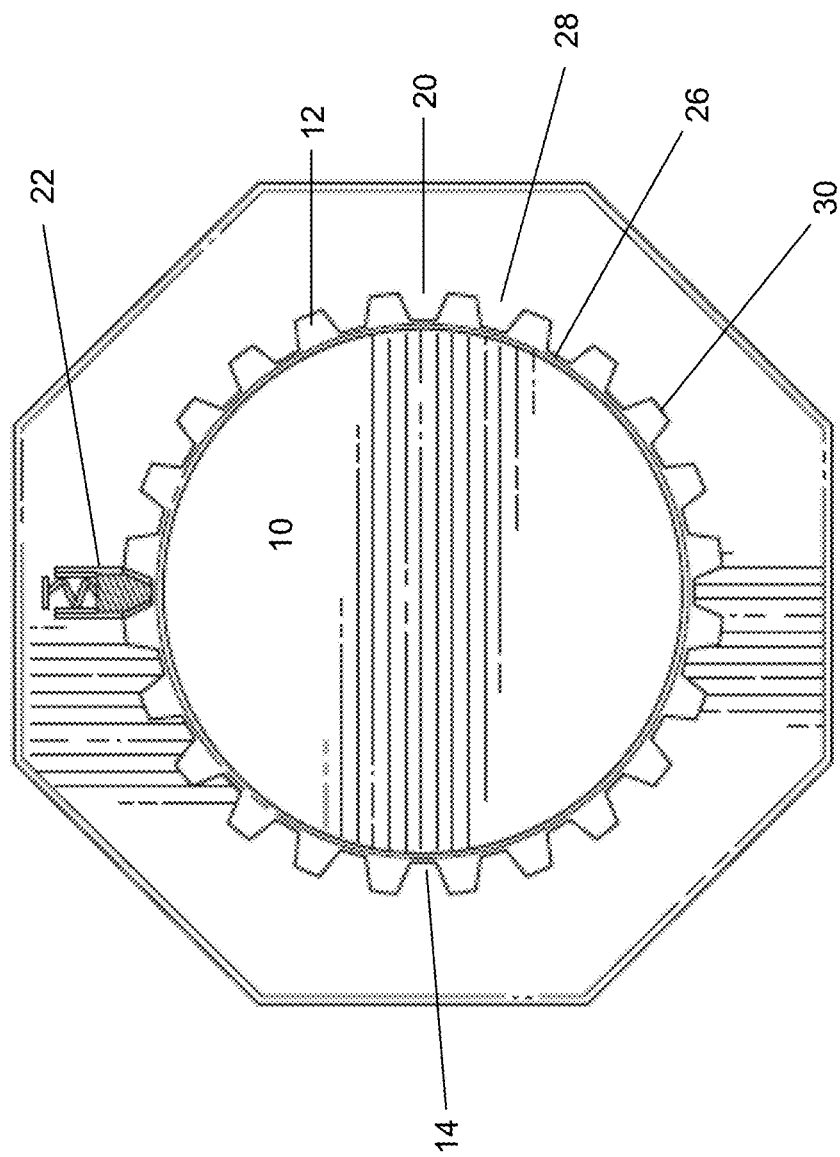
FIG. 2 is a top view of a male and female fastener combination described herein.
Figure 3:
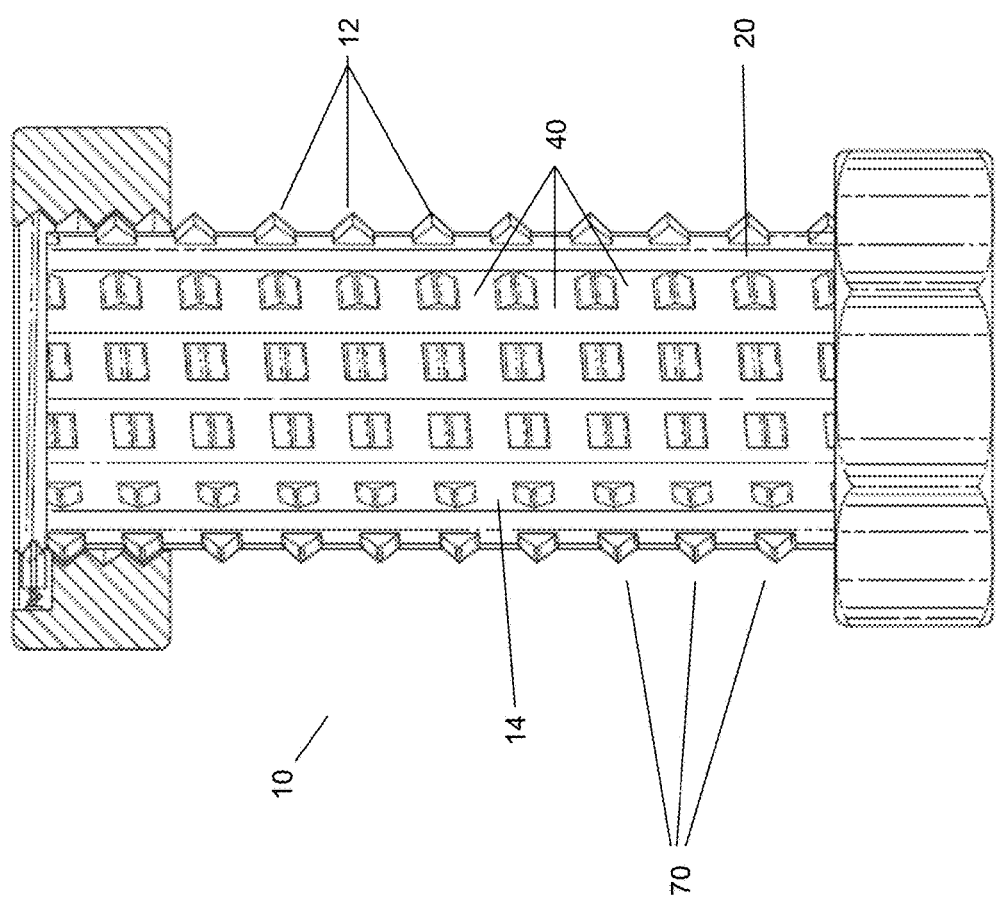
FIG. 3 is a side view of a male and female fastener combination described herein.
Figure 4:
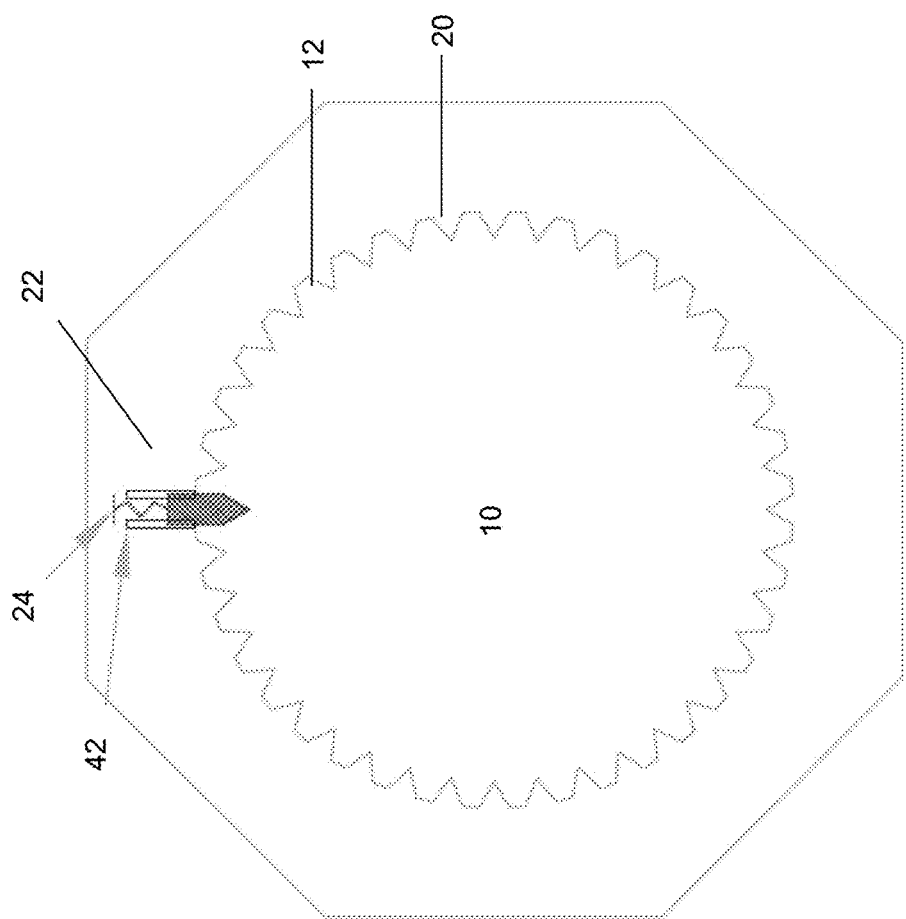
FIG. 4 is a cross-sectional view of a male and female fastener combination described herein, showing a plunger being used to secure the female fastener in place.

The following will describe, in detail, several preferred embodiments of the present invention. These embodiments are provided by way of explanation only, and thus, should not unduly restrict the scope of the invention. In fact, those of ordinary skill in the art will appreciate upon reading the present specification and viewing the present drawings that the invention teaches many variations and modifications, and that numerous variations of the invention may be employed, used and made without departing from the scope and spirit of the invention.

Referring now to FIGS. 1-9, according to certain preferred embodiments of the present invention, male and female threaded fasteners are provided, such as screws, bolts, nuts, washers, and the like, which incorporate or are adapted to be used with certain plunger components. The female fasteners (e.g., nuts and washers) are adapted to be secured to the male fasteners (e.g., screws and bolts) in a manner that avoids unwanted and potentially dangerous loosening of such female fasteners from the male fasteners, e.g., as a result of vibrations or other forces over time. The invention provides that the male fasteners of the present invention are adapted to be received by and connected to a female fastener. More particularly, the male fasteners will include a rigid (and, in some cases, cylindrical) shaft 10, which is configured to be disposed through and rotated within an aperture located in the middle of a female fastener (e.g., a nut), such that the channels (described below) on the shaft 10 of the male fasteners are allowed to receive and engage corresponding threads located within an aperture of the female fasteners.

When defined broadly, according to certain preferred embodiments, the invention encompasses male fasteners (e.g., screws/bolts) and female fasteners (e.g., nuts/washers), as described herein, along with a plunger 22 that can be used to lock the female fasteners in place, so that the female fasteners (e.g., nuts/washers) are prevented from "loosening" and rotating in a counter-clockwise direction about the shafts of male fasteners. In such embodiments, the plunger 22 may be configured to exist within or in proximity of the bottom surface of the female fastener (e.g., the nut or washer)—or, as described below, the plunger 22 may be integrally formed with the outward facing surface of the aperture of the female fastener (nut). The plunger 22 is preferably configured to be inserted into one or more trenches 20 located along the axis of the shaft 10 that is configured to receive the plunger 22. Importantly, the plunger 22 (and the shape of the trench 20 that receives the plunger 22) will be configured to allow the female fastener (nut) to be rotated in a manner (e.g., in a clockwise direction) that allows the female fastener (nut) to travel towards the top of the male fastener (screw/bolt) along its shaft 10, in order to "tighten" the female fastener (nut) to the male fastener (screw/bolt), while being configured to prevent the female fastener (nut) from rotating in a manner (e.g., in a counter-clockwise direction) that allows the female fastener (nut) to travel away from the top of the male fastener (screw/bolt) along its shaft 10, which would otherwise "loosen" the female fastener (nut).

According to certain specific embodiments of the present invention, the shaft 10 of the male fasteners will include a continuous radial wall 70 that forms a continuous channel 40 that radially travel around a circumference of the shaft 10 from a top portion of the male fastener to a bottom portion of the male fastener. The invention provides that the continuous radial wall 70 will preferably include a plurality of protruding elements 12 that extend outwardly from the external surface 14 of the shaft 10 (the protruding elements 12 form the trenches 20 referenced above). The invention provides that the protruding elements 12 are radially positioned in a spiral around the circumference of the shaft 10 (i.e., which forms the continuous radial wall 70). In addition, the rows of protruding elements 12 are positioned and oriented in a way to create the channels 40 between the rows of protruding elements 12. This resulting channel 40 radially travels and wraps around (in a spiral fashion) the circumference of the shaft 10, beginning at or near the top portion 16 of the male fastener and terminating at or near the bottom portion 18 of the male fastener. The invention provides that the channel 40 is adapted to receive a corresponding thread (or set of threads) located within an aperture of the female fastener. This way, the threads of the female fastener may engage the channel 40, such that the female fastener may be rotated (clockwise) in a way that causes the female fastener to travel towards the top 16 of the male fastener along its shaft 10 (i.e., to "tighten" the female fastener). Of course, when placed into use, the shaft 10 of the male fastener will be disposed through an aperture located in another item (or located in multiple items), with the female fastener then being applied and rotated about the shaft 10, such that the item (or multiple items) will be located between a top 16 of the male fastener and the female fastener.

The invention provides that the protruding elements 12 are preferably spaced equidistantly apart. The equally spaced protruding elements 12 form a void or cavity (i.e., a trench) 20, between each protruding element 12. The invention provides that, in certain embodiments, this resulting trench 20 may be adapted to form another trench-channel that is parallel to the long axis of the male fastener. Importantly, the invention provides that the trench 20 is configured to receive a plunger 22 (or, alternatively, the plunger 22 may be configured to be inserted into multiple trenches 20). More particularly, the invention provides that the outer dimension of the plunger 22 will be configured to be inserted into, and to nestably mate with, one or more trenches 20. When the plunger 22 is inserted into one or more trenches 20, the plunger will function to prevent the female fastener from rotating around the shaft 10 (in a counter-clockwise fashion), such that the female fastener is prevented from traveling in a direction towards the bottom portion 18 of the male fastener. More particularly, when the plunger 22 is inserted into one or more trenches 20, the plunger 22 is configured to prevent the female fastener from rotating in a counter-clockwise direction (which would otherwise cause the female fastener to travel along the shaft 10 towards the bottom portion 18 of the male fastener, which would loosen the female fastener (relative to the item(s) that the male and female fasteners are securing)). As mentioned above, in certain embodiments, the plunger 22 may be configured to span across, and be inserted into, multiple trenches 20 located along the shaft 10 of the male fastener at the same time—which creates enhanced resistance to prevent the female fastener from rotating in a counter-clockwise direction about the shaft 10 of the male fastener.

According to certain preferred embodiments, the invention provides that the plunger 22 may optionally be equipped with a spring 24, whereby the spring 24 exerts a constant force that pushes the plunger 22 into the trench 20 located between two protruding elements 12. The invention provides that the spring 24 may reside between two solid guiding walls 42, which form a part of the plunger 22. Still further, according to certain embodiments, the invention provides that the plunger 22 may be incorporated within (and made a part of) the female fastener, as illustrated in FIG. 7. In certain embodiments, the plunger 22 may be flush with an outer surface of the female fastener (FIG. 1), such that the plunger 22 may be manually accessible from an external (outer/bottom) surface of the female fastener, such that (if desirable) the plunger 22 may be manually pulled out of the trench 20, in order to allow the female fastener to freely rotate about the shaft 10 of the male fastener in a counter-clockwise (loosening) fashion, i.e., to cause the female fastener to travel towards the bottom portion 18 of the male fastener.

Referring now to FIGS. 5A and 5B, the invention provides that the shape and inner dimensions of the trenches 20 will preferably include a wall that prevents the plunger 22 from traveling to a previous trench 20 (and a ramp that allows the plunger 22 to travel to the next trench 20). More particularly, according to certain preferred embodiments, the invention provides that the trench 20 located between each of the protruding elements 12 may include a first area 26 adjacent to the external surface 14 of the shaft 12, and a second area 28 that is contiguous with a top portion 30 of the protruding elements 12. The invention provides that the first area 26 of the trench 20 will preferably include less volume (and will exhibit a smaller dimension) than the second area 28 of the trench 20. This configuration creates a trench 20 that is widest at the second area 28 that is contiguous with a top portion 30 of the protruding elements 12, and narrows as the trench 20 approaches the first area 26 adjacent to the external surface 14 of the shaft 12. In such embodiments, the plunger 22 will exhibit a corresponding outer dimension. More particularly, the tip of the plunger 22—which is inserted into the trench 20—will comprise an area that narrows as it approaches the end (tip) of the plunger 22 that is inserted into the trench 20 and will reside adjacent to the external surface 14 of the shaft 12.

According to yet further embodiments of the present invention, as mentioned above, the plurality of protruding elements 12 may be configured to impart more resistance on movement of the plunger 22 in one direction versus the other. More particularly, in such embodiments, the protruding elements 12 may be configured to impart more resistance on movement of the plunger 22 from one trench 20 to another adjoining trench 20 when such such movement is to the left (or counter-clockwise direction), compared to the amount of resistance that is applied when the plunger 22 is moved from one trench 20 to another adjoining trench 20 to the right (or clockwise direction). In other words, the plurality of protruding elements 12 may be configured to impart more resistance on (or to prevent) movement of the plunger 22 to a trench 20 located to the left (such that the female fastener would not be allowed to rotate in a counter-clockwise fashion and loosen), compared to a lesser amount of resistance that is applied to movement of the plunger 22 to a trench 20 located to the right (such that the female fastener would be allowed, with minor force, to rotate in a clockwise fashion and to be tightened).

According to such embodiments, each trench 20 located between each protruding element 12 will preferably include four surfaces, with the four surfaces being formed by the protruding elements 12 on each side of the trench 20. More specifically, and referring to FIG. 5A, the space will include a first (left) surface 32 that is positioned perpendicular to a line that runs tangential to the external surface 14 of the shaft 10. According to such embodiments, the second surface 34 is contiguous with the first surface 32, and the second surface 34 is positioned at about a 30-degree angle to the line that runs tangential to the external surface 14 of the shaft 10. According to such embodiments, a third surface 36 is contiguous with the second surface 34, with the third surface 36 being positioned at about a 60-degree angle to the line that runs tangential to the external surface 14 of the shaft 10. Finally, according to such embodiments, the fourth surface 38 will be contiguous with the third surface 36, and the fourth surface 38 will be positioned at about a 20-degree angle to the line that runs tangential to the external surface 14 of the shaft 10. These four surfaces—32, 34, 36, and 38—will collectively form each trench 20. The invention provides that the orientation of the first surface 32—being perpendicular to a line that runs tangential to the external surface 14 of the shaft 10—will be effective to strongly resist (or prevent) unwanted movement of the plunger 22 to a trench 20 located to its left, i.e., it will strongly resist (or prevent) the ability of the plunger 22 and female fastener from rotating in a counter-clockwise fashion (which would otherwise loosen the female fastener). In contrast, the slope created by the angles of the third surface 36 and fourth surface 38 will permit the plunger 22 to slidably move to a trench 20 located to its right with much less resistance, such that the plunger 22 and female fastener may be rotated in a clockwise fashion in order to tighten the female fastener.

In still further embodiments, the invention provides that the plunger 22 may be integrally formed with the outward facing (threaded) surface of the aperture of the female fastener (FIGS. 6A and 6B). In these embodiments, the plunger 22 will preferably exhibit a sloped surface 50 that is configured to permit the plunger 22 (and the connected female fastener) to rotate about the shaft 10 of the male fastener in a clockwise direction with minimal force, such that the plunger 22 will not interfere with the female fastener being rotated and "tightened," e.g., the slope of surface 50 will preferably be less than 45-degrees relative to a line that runs tangential to the external surface 14 of the shaft 10 (and the top or tip of surface 50 will preferably be sufficiently long to rest on top of an adjacent protruding element 12, so that surface 50 will be allowed to glide over the protruding elements 12 when the female fastener is rotated clockwise). In addition, the plunger 22 will further exhibit a surface 52 (or a portion of surface 52) that is positioned greater than 45-degrees to a line that runs tangential to the external surface 14 of the shaft 10, such that the surface 52 of the plunger 22 (and the connected female fastener) are prevented from rotating about the shaft 10 of the male fastener in a counter-clockwise direction, which would otherwise "loosen" the female fastener.

Referring now to FIGS. 7A-7D, a perspective view of another set of male and female fasteners (bolt/nut) encompassed by the present invention is shown. In this embodiment, the plunger 22 (as shown in FIG. 7B) is integrally formed within the aperture of the female fastener (FIG. 7A). In such embodiments, the trenches 20 created by the protruding elements 12 located on the shaft 10 of the male fastener (FIGS. 7A and 7C) are configured to nestably receive and engage with the plunger 22 (as shown in FIG. 7D)—although, as described above, the trenches 20 and plunger 22 are configured to impart more resistance on movement of the plunger 22 in one direction (a loosening direction/rotation) versus the other (a tightening direction/rotation).

Figure 8B:
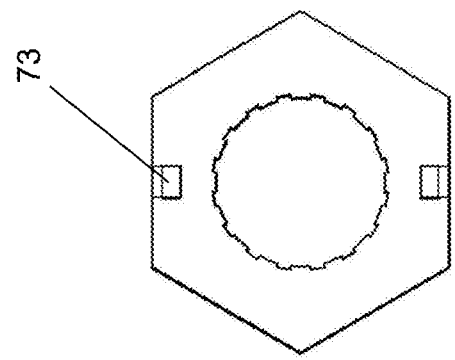
FIG. 8B is a top view of the combined male and female fasteners shown in FIG. 8A.
Figure 8A:
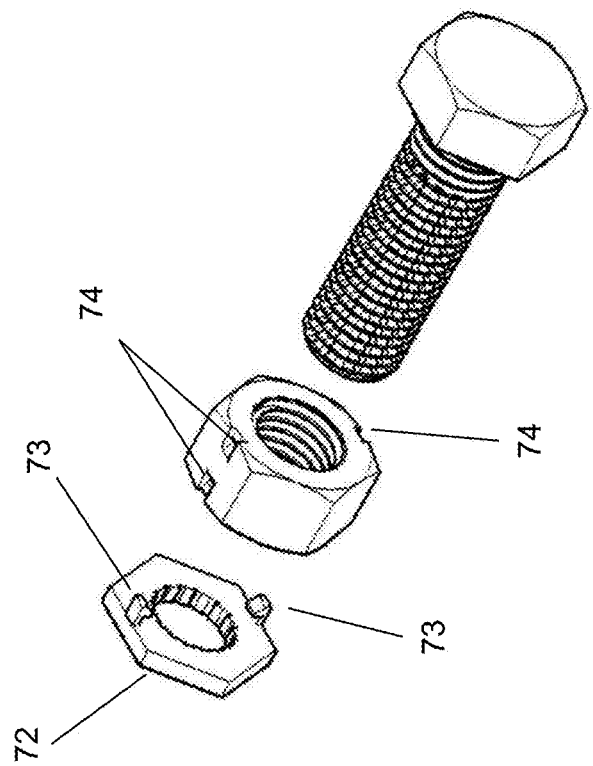
FIG. 8A is a perspective view of another set of male and female fasteners (bolt/nut) described herein, along with a washer that includes a set of plunger elements.
Figure 9:
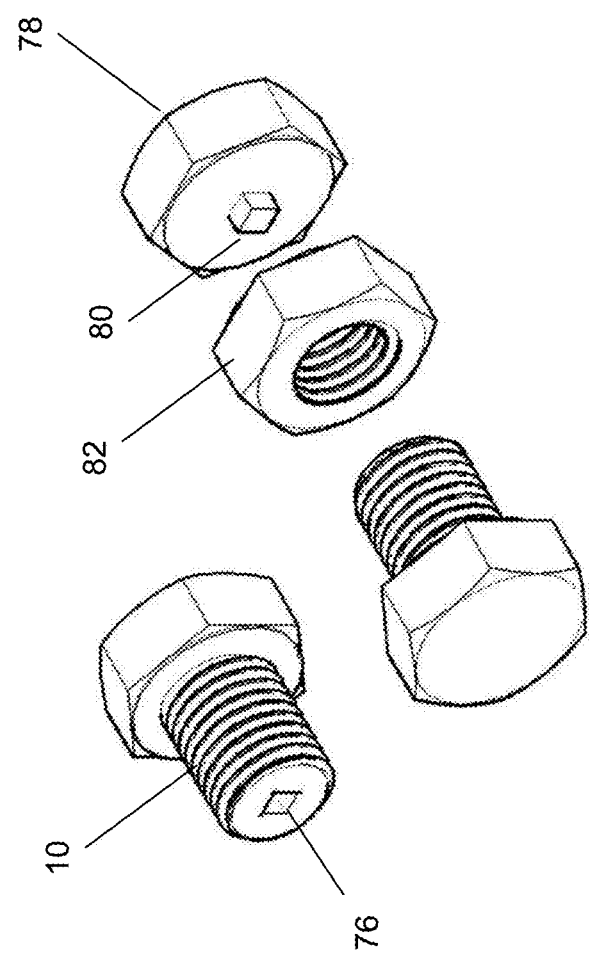
FIG. 9 is a perspective view of yet another set of male and female fasteners (bolt/nut) described herein.

Referring now to FIGS. 8A, 8B, and 9, the invention encompasses yet further alternative embodiments. For example, the invention encompasses a set of male and female fasteners (bolt/nut) as described herein, along with a washer 72 that includes a set of clip elements 73. In such embodiments, as shown in FIG. 8A, the set of clip elements 73 are configured to extend outward from the surface of the washer 72 that, when the washer 72 is applied along the shaft 10 of the male fastener, will rest against (or adjacent to) a corresponding surface of a second female fastener (a nut/bolt). In such embodiments, the second female fastener (a nut) will include a set of cavities 74 that are configured to nestably receive the set of clip elements 73 of the washer 72, when the washer 72 and second female fastener (nut) are applied to the shaft 10 of the male fastener. In this embodiment, the washer 72 will engage the second female fastener (nut) through the mating set of clip elements 73 and cavities 74 to avoid undesired loosening of the second female fastener (nut). More particularly, the invention provides that once the nut is tightened along the shaft 10 of the male fastener, the washer 72 may then be applied to the shaft 10 and connected to the nut through the set of clip elements 73 and cavities 74. In certain embodiments, the invention provides that the washer 72 will comprise its own plunger 22, which is configured to be inserted into one or more trenches 20 along the shaft 10 of the male fastener (as described above relative to other embodiments). In certain other embodiments, the plunger 22 associated with the washer 72 may be static—i.e., it may be configured to be inserted into one or more trenches 20 along the shaft 10 of the male fastener (to lock the washer 72 in place), but not configured to move from one trench 20 to another (as described above relative to other embodiments). As such, when the washer 72 is connected to the nut through the set of clip elements 73 and cavities 74, the nut is prevented from unwanted loosening.

Similarly, and referring now to FIG. 9, the invention encompasses yet another set of male and female fasteners (bolt/nut) described herein, which includes a male fastener that comprises a space 76 located within a bottom surface of the distal end of the shaft 10; a standard female fastener/nut 82; and a second female fastener 78 that includes a plunger 80 located on a surface that—when applied to the shaft 10—will rest adjacent to a bottom surface of the standard female fastener 82. In this embodiment, the plunger 80 is configured to be nestably inserted into the space 76 located at the distal end of the shaft 10. The invention provides that the shaft 10 must be sufficiently long to extend through the aperture of the standard female fastener 82 to allow the space 76 to engage and nestably mate with the plunger 80 of the second female fastener 78. Conversely, the plunger 80 must be configured to reach and be capable of nestably mating with the space 76 located at the distal end of the shaft 10. In this embodiment, the second female fastener 78 will engage the distal end of the shaft 10 through the mating plunger 80 and space 76 to avoid undesired loosening of the standard female fastener 82. More particularly, the invention provides that the bolt shaft 10 must exhibit a correct length such that when certain items are bound together by an otherwise standard nut 82, the second female fastener 78, when mated with the bolt via space 76 and plunger 80, will rest against the surface of the nut 82. In such embodiments, if the items bound together exert pressure on nut 82 to loosen, it will face resistance from the second female fastener (nut) 78 that rests against it.

According to further aspects of the present invention, sets of male and female fasteners (as described above) are included. In such embodiments, the plunger 22 may be incorporated into such female fasteners or, alternatively, the plunger 22 may exist as a separate component. According to yet further aspects of the present invention, sets of male fasteners, female fasteners, and the plungers 22 described herein are included. Similar to the other embodiments of the present invention, the plunger 22 may be incorporated into such female fasteners or, alternatively, the plunger 22 may exist as a separate component. The invention provides that the male fasteners, female fasteners, and plungers 22 described herein may be comprised of any suitably rigid materials, such as steel, iron, plastics, and others.

The many aspects and benefits of the invention are apparent from the detailed description, and thus, it is intended for the following claims to cover all such aspects and benefits of the invention that fall within the scope and spirit of the invention. In addition, because numerous modifications and variations will be obvious and readily occur to those skilled in the art, the claims should not be construed to limit the invention to the exact construction and operation illustrated and described herein. Accordingly, all suitable modifications and equivalents should be understood to fall within the scope of the invention as claimed herein.

What is claimed is:
1. A male fastener, a female fastener, and a plunger, whereby the male fastener is adapted to be received by and connected to the female fastener, wherein:
  (a) the male fastener comprises a rigid shaft, which includes a continuous radial wall that forms a channel that radially travels around a circumference of the shaft from a top portion of the male fastener to a bottom portion of the male fastener, wherein the channel is adapted to receive corresponding threads located within an aperture of the female fastener; and
  (b) the plunger is dimensioned and configured to, without mechanical reinforcement provided by other elements, prevent the female fastener from rotating around the shaft in a direction that causes the female fastener to move towards the bottom portion of the male fastener, and wherein:
  (i) the plunger is further dimensioned and configured to permit the female fastener to rotate around the shaft in a direction that causes the female fastener to move towards the top portion of the male fastener, while the plunger makes continuous contact with the shaft;
  (ii) the shaft of the male fastener comprises a series of protruding elements, which are located within the continuous radial wall that forms the channel;
  (iii) the protruding elements are spaced equally apart, wherein a trench is formed between each protruding element, wherein the plunger is adapted to be inserted into the trench or multiple trenches located between multiple protruding elements; and
  (iv) the plurality of protruding elements are configured to prevent movement of the plunger from a first trench located along one or more protruding elements to an adjoining second trench located along one or more protruding elements.

2. The male fastener, female fastener, and plunger of claim 1, wherein the male fastener is a machine screw or bolt and the female fastener is a nut.

3. The male fastener, female fastener, and plunger of claim 1, wherein the male fastener is a bolt and the female fastener is a nut.

4. The male fastener, female fastener, and plunger of claim 1, wherein the plunger is attached to the female fastener.

5. The male fastener, female fastener, and plunger of claim 1, wherein the plunger is not attached to the female fastener.

6. The male fastener, female fastener, and plunger of claim 1, wherein the plunger is integrally formed with the female fastener.

7. A male fastener, a female fastener, and a washer, whereby the male fastener is adapted to be received by and connected to the female fastener and the washer, wherein:
  (a) the male fastener comprises a rigid shaft, which includes a continuous radial wall that forms a channel that radially travels around a circumference of the shaft from a top portion of the male fastener to a bottom portion of the male fastener, wherein the channel is adapted to receive corresponding threads located within an aperture of the female fastener and washer; and
  (b) the washer includes one or more clips that are configured to nestably mate with one or more cavities located within the female fastener, wherein:
  (i) the washer further includes a plunger that is configured to mate with a trench located within the shaft of the male fastener, wherein the plunger and trench are each dimensioned and configured to permit rotation of the washer in a tightening direction and to prevent rotation of the washer in a loosening direction; and
  (ii) the washer is further configured to prevent the female fastener from rotating around the shaft in a direction that causes the female fastener to move towards the bottom portion of the male fastener, wherein the female fastener and washer are configured to be immobilized and locked into position at any location along the rigid shaft of the male fastener.

8. A male fastener, a first female fastener, and a second female fastener, wherein the male fastener is adapted to be received by and connected to the first female fastener and:
  (a) the male fastener comprises a rigid shaft, which includes a continuous radial wall that forms a channel that radially travels around a circumference of the shaft from a top portion of the male fastener to a bottom portion of the male fastener, wherein the channel is adapted to receive corresponding threads located within an aperture of the first female fastener;
  (b) a distal end of the rigid shaft of the male fastener includes one or more spaces;
  (c) a surface of the second female fastener includes one or more plungers that are configured to nestably mate with the one or more spaces located at the distal end of the rigid shaft of the male fastener; and
  (d) the one or more spaces and one or more plungers, when nestably connected with each other, are configured to prevent the first female fastener from rotating around the shaft in a direction that causes the first female fastener to move towards the distal end of the rigid shaft of the male fastener.

* * * * *